United States Patent [19]

Farber et al.

[11] Patent Number: 4,862,037
[45] Date of Patent: Aug. 29, 1989

[54] AUTOMATIC HEADLAMP DIMMING SYSTEM

[75] Inventors: Eugene I. Farber; Lyman M. Forbes, both of Birmingham, Mich.

[73] Assignee: Ford Motor Company, Dearborn, Mich.

[21] Appl. No.: 137,773

[22] Filed: Dec. 24, 1987

[51] Int. Cl.⁴ ............................................. B60Q 1/02
[52] U.S. Cl. ..................................... 315/83; 315/82; 315/155; 315/156
[58] Field of Search ...................... 315/79, 82, 83, 158, 315/159, 155, 156

[56] References Cited

U.S. PATENT DOCUMENTS

| | | | |
|---|---|---|---|
| 3,079,529 | 2/1963 | Novinger | 315/82 |
| 3,177,397 | 4/1965 | Keeran | 362/276 |
| 3,373,311 | 3/1968 | Neulinger et al. | 315/83 |
| 3,617,795 | 11/1971 | Peek | 315/83 |
| 3,673,421 | 6/1972 | Hicks et al. | 315/83 |
| 3,736,416 | 5/1973 | Goodwin | 362/276 |
| 3,818,265 | 6/1974 | Hicks et al. | 315/82 |
| 3,894,227 | 7/1975 | Pitkjaan et al. | 315/83 |
| 3,999,058 | 12/1976 | Pryplat | 240/62 R |
| 4,236,099 | 10/1980 | Rosenblaum | 315/83 |
| 4,303,965 | 12/1981 | Vile et al. | 362/61 |
| 4,503,488 | 3/1985 | Soules et al. | 362/80 |
| 4,599,544 | 7/1986 | Martin | 315/82 |
| 4,645,975 | 2/1987 | Meitzler et al. | 315/82 |

Primary Examiner—Donald J. Yusko
Assistant Examiner—Brian S. Palladino
Attorney, Agent, or Firm—Paul K. Godwin Jr.; Clifford L. Sadler

[57] ABSTRACT

A method and apparatus for automatically responding to headlamp radiation from oncoming vehicles to down-switch beam patterns in a tri-beam headlamp system in an automotive vehicle. A mid-beam sensor is provided to detect only that headlamp radiation from oncoming vehicles present within the defined high intensity projection areas of the mid-beam pattern and functions in conjunction with a conventional automatic dimmer sensor and a unique control circuit to achieve appropriate and automatic down-switching.

18 Claims, 3 Drawing Sheets

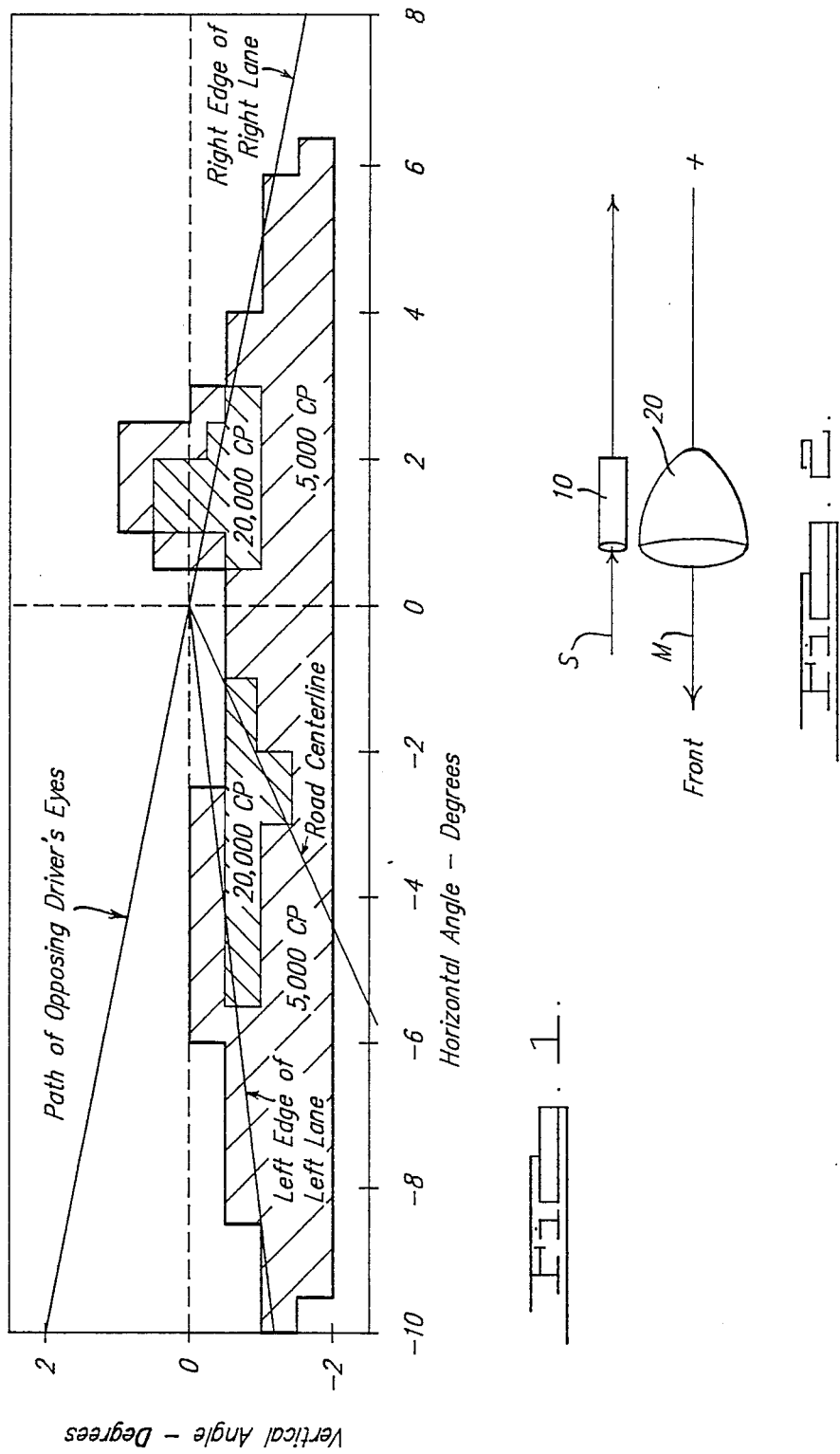

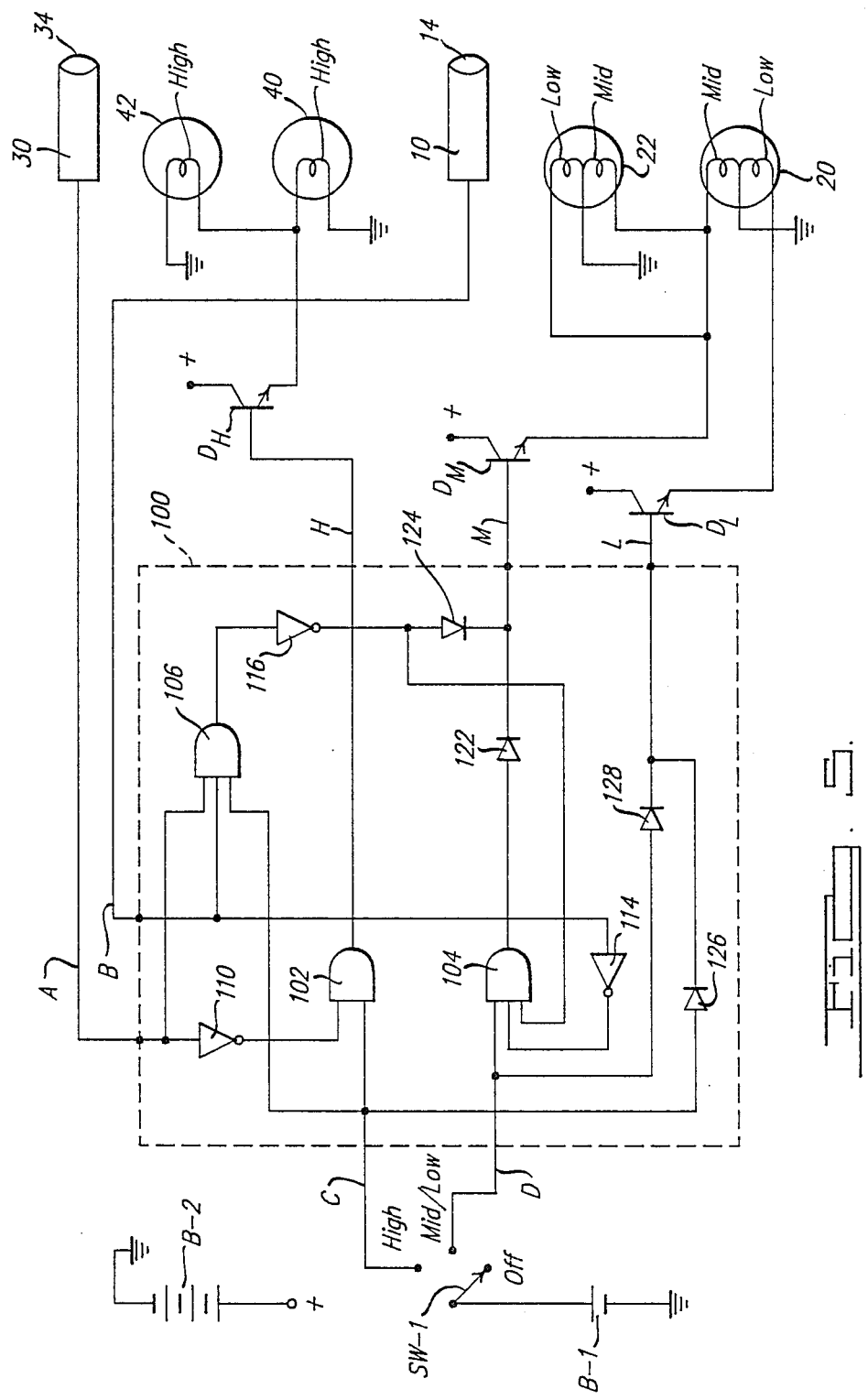

AUTOMATIC HEADLAMP DIMMING SYSTEM

BACKGROUND OF THE INVENTION

1. Field of the Invention

The present invention is directed to the field of automotive headlamp systems and more specifically to the area of automatic control for such systems in order to down-switch the beam patterns and prevent interfering glare to oncoming drivers.

2. Description of the Prior Art

In U.S. Pat. Nos. 3,373,311 and 3,894,227 inventions are disclosed which provide "tri-beam" headlighting systems of low, mid and high beam patterns controlled by various manually actuated switches to obtain the appropriate selection.

Low-beam headlamps are designed to provide adequate illumination for a vehicle operator without producing unacceptable glare for operators of opposing or oncoming vehicles. The low-beams are directed so that the high intensity projection areas of its beam patterns are directed sightly down and to the right for countries of the world which utilize right hand traffic patterns. In left hand traffic patterns, the low-beams are aimed down and slightly to the left. (For the remainder of this discussion right hand traffic patterns will be assumed.) With the use of low-beams, the left lane, the mid foreground and the right lane, beyond approximately 150 feet, are not intensely lighted. On the other hand, high-beam patterns are generally directed so as to cover much wider horizontal and vertical angles that will cause glare in the eyes of drivers of oncoming vehicles even on straight roads.

The mid-beam concept, although first disclosed several years ago, provides more usable light directed to the right edge of the driving lane without causing increased glare to opposing drivers, while on straight roads. However, the mid-beam concept has not been adopted by the industry. It is believed this reluctance to adopt such an improvement in headlighting systems is based upon the fact that when a mid-beam system is utilized, there are still those instances when the mid-beams have to be down-switched to the low-beams in order to prevent glare from interfering with the vision of the oncoming driver. For instance, when the road geometry varies (curves and hills) or the lamps are misaimed so that they could cause the high intensity projection areas of the mid-beam pattern to be directly aimed at opposing drivers, down-switching of the lights is required. Taking into consideration the aforementioned patents it is believed that such systems of manually down-switching from mid to low-beams by a vehicle operator would require the operator to have a sophisticated understanding of the system concepts in order to appreciate the necessity of when to manually down-switch the beams. It is clearly evident that a manually controlled mid-beam system is not practical, since it has not been adopted by the industry. Applicants have appreciated that it would be desirable to have an automatic headlamp control system, but such control systems presently available for high-beam down-switching will not function for a "tri-beam" headlighting system. U.S. Pat. Nos. 3,177,397; 4,599,544; and 4,645,975 are typical of such high-beam control systems.

SUMMARY OF THE INVENTION

Applicants have invented a unique system which automatically determines the appropriateness of down-switching from either the high to mid, high to low, or mid to low beams without the need for manual intercession by the vehicle operator. By providing a conventional high-beam sensor, a mid-beam sensor which is uniquely configured to sense the presence of oncoming vehicles in the mid-beam pattern projection area and a unique control circuit, the automatic down-switching is achieved.

BRIEF DESCRIPTION OF THE DRAWINGS

FIG. 1 is an isocandella diagram showing candle power contours of the high intensity portion of a mid-beam pattern.

FIG. 2 illustrates a preferred geometric relationship between a headlamp that generates a mid-beam pattern and an associated mid-beam sensor.

FIG. 5 is a schematic of a control circuit employed to provide the automatic down-switching of the present invention.

DETAILED DESCRIPTION OF THE PREFERRED EMBODIMENT

Figure 3:
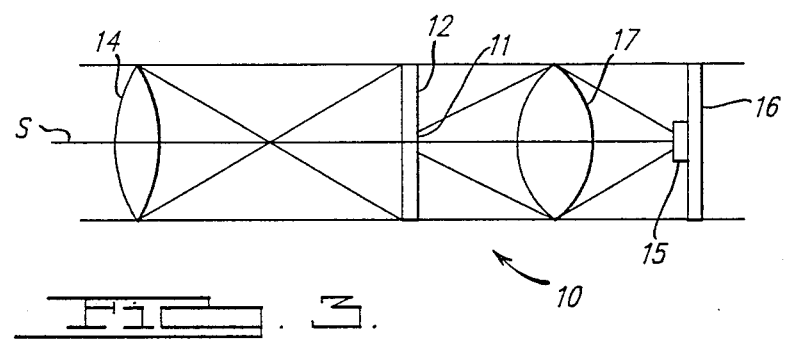
FIG. 3 is a schematic representation of a mid-beam sensor such as is shown in FIG. 2.

The isocandella diagram shown in FIG. 1 is a gross plot of the high intensity pattern as projected by a mid-beam headlamp system. The diagram illustrates the high intensity beam pattern over a projection area above and below a horizontal reference line, as well as left and right of a vertical center line coincident with the center line of the vehicle. The designated angled lines on the diagram represent the perspective view of the right edge of the right lane, the road center line, the left edge of the left lane and the path of the eyes of an opposing driver, as it would appear when viewed from the vantage point of the left, outboard headlamp. It can seen from the diagram in FIG. 1 that one highest intensity (5,000–20,000 cp) illumination area for the mid-beam light projection is below the horizontal reference when referenced to the left of the vehicle center line and well below the path of opposing driver's eyes. Also, the mid-beam pattern provides another highest intensity illumination area both above and below the horizontal reference to illuminate the right edge of the right lane, when referenced to the right of the vehicle center line.

By concentrating on the center of the diagram as depicting the distant horizon on a flat straight road, it can be seen that the normal areas of projection by the mid-beam pattern would not cause irritating glare to be present in the eyes of an opposing driver. However if one imagines that the road curves off to the right, or that the center portion is a hill crest below the horizontal reference, the high intensity illumination pattern will intersect the line designated as the path of an opposing driver's eyes. In those instances, it is necessary to down-switch the beam to the low-beam pattern.

In the present invention, it is intended that, in normal use, the mid-beam headlamp will be on and that a mid-beam light sensor be provided which senses the presence of headlamps from only those oncoming vehicles that enter into the projection areas of the mid-beam pattern. When the mid-beam light sensor detects the presence of opposing headlamps in the projection areas of the mid-beam pattern, the mid-beam is automatically turned off. When this sensor no longer detects opposing headlamps, the mid-beam is turned back on.

Since the mid-beam pattern provides such a highly tuned radiation beam pattern, it is essential that the mid-beam headlamps be properly aligned in the vehicle so as not to cause excessive glare in the eyes of the opposing drivers. It is therefore preferable that the sensor be positioned on the vehicle so that its optical axis is parallel and closely aligned to the axis of the mid-beam headlamp. That configuration is shown in FIG. 2 where the sensor 10 and the headlamp 20 are shown as respective having optical axes S and M parallely configured. If the sensor 10 and the headlamp 20 are provided with a fixed and rigid interconnection mounting, the system will still function even if there is an occurrence of misaiming of the mid-beam headlamp. In the event of misaiming, the system will continue to function to protect the eyes of oncoming drivers by down-switching the beam patterns when the oncoming headlamps of those vehicles are sensed within the mid-beam pattern projection area.

Figure 3A:
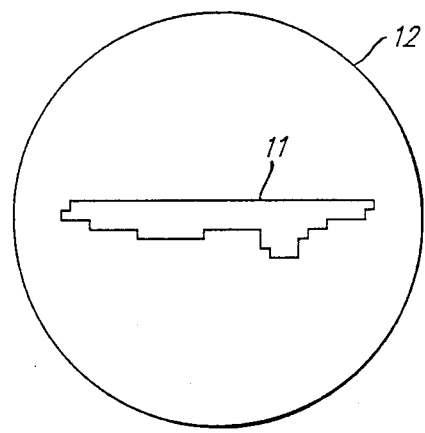
FIG. 3A is a plan view of a mask employed in the sensor shown in FIG. 3.

FIG. 3 illustrates a first embodiment of a mid-beam headlamp sensor 10 in which a forward field lens 14 is aligned along the optical axis S extending through the sensor 10. A mask 12 (detailed in FIG. 3A) is shown as being in the focal plane of an object lens 14 and contains an aperture 11 at the focal plane which outlines the inverted mid-beam pattern as shown in FIG. 1. A focusing lens 17 is positioned behind the mask 12 so as to focus any light passing through the aperture 11 onto a photodetector 15. Photodetector 15 is shown as being at the focal point of the lens 17 and mounted on a substrate 16. When this sensor 10 is mounted so that its optical axis S is aligned with the optical axis M of the mid-beam headlamp 20, light from the headlamps of oncoming vehicles will pass through the mask only when the location of the oncoming headlamps coincides with the mid-beam pattern projection area.

Figure 4:
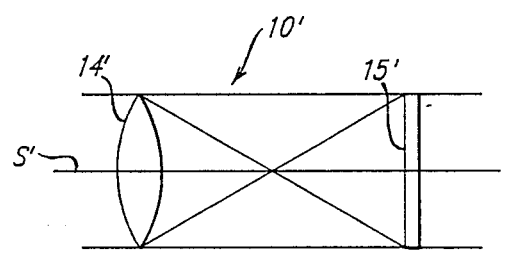
FIG. 4 is a schematic representation of a second embodiment of a sensor such as is shown in FIG. 2.
Figure 4A:
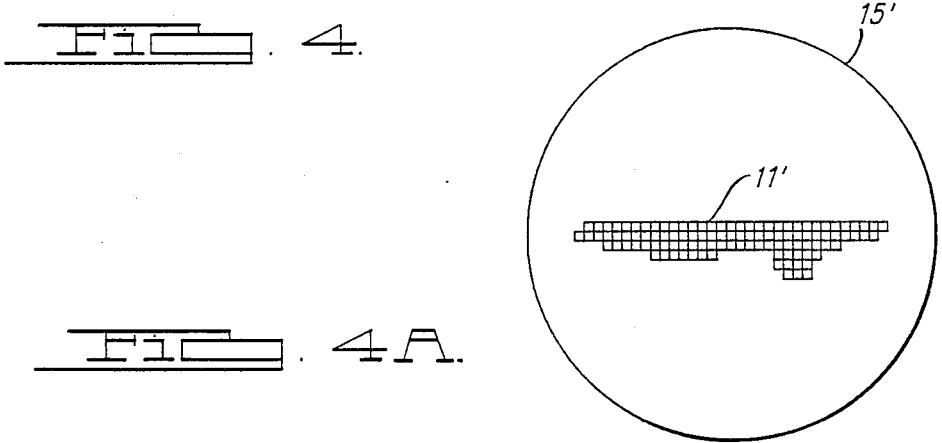
FIG. 4A is a plan view of a detector array employed in the sensor shown in FIG. 4.

FIG. 4 illustrates a second embodiment of mid-beam headlamp sensor 10'. In sensor 10', an object lens 14' has an optical axis S' and a detector 15'. In this case, the detector 15' is a photocell array 11' (detailed in FIG. 4A) disposed on the focal plane of lens 14'; and the array 11' is configured as the inverted image of the mid-beam pattern shown in FIG. 1. The detector 15' located at the focal plane of the lens 14'; functions in a manner similar to the photodetector 15 shown in FIGS. 3 and 3A. The advantage of a sensor such as shown in FIG. 4 is that less optical elements are required, while continuing to achieve appropriate detection of oncoming headlamps solely within the mid-beam pattern projection area. In addition, it is envisioned that circuitry may be combined with the sensor shown in FIG. 4 to distinguish between opposing headlamps and other light sources which might be sensed and inappropriately cause the mid-beam headlamps to be down-switched.

FIG. 5 is an electrical circuit diagram illustrating a preferred embodiment of implementing the present invention. In that diagram, four headlamps 20, 22, 40 and 42 are selectively energized by an electrical energy source (Battery B-2) through current drivers $D_L$, $D_M$ or $D_H$, via a control circuit 100. The headlamps 40 and 42 are designated as containing only the high-beam filaments; and the lamps 20 and 22 are shown as each containing both low-beam and mid-beam filaments. Of course, other configurations such as arc lamps or separate lamps for high, mid and low beams could also be controlled in a manner using principals similar to those disclosed herein.

In FIG. 5, a high-beam sensor 30, with a lens 34, is shown and is assumed to be a conventional high-beam sensor which detects light radiation forward of the vehicle in a wide range that is at least as great as the high-beam pattern projection area. In any event the range of light detection of the sensor 30 overlaps the mid-beam pattern projection area. The detection of oncoming vehicle headlamps within the sensing area of high-beam sensor 30 is provided as a voltage signal on line A which is also connected to control circuit 100.

A mid-beam sensor 10 may be either of the sensors previously discussed with regard to FIGS. 3 and 4 and is configured to only sense light present in the mid-beam projection area and produced by oncoming vehicles within that limited detection area. Upon detecting light, the sensor 10 provides a voltage output on line B which is connected to the control circuit 100.

A battery B-1 is shown as providing logic level energy to the control circuit 100 via a headlamp switch SW-1. The headlamp switch SW-1 is shown as having three manually selected switch position settings including "Off", "Mid/Low" and "High".

The control circuit 100 contains various logic elements configured to provide output signals on the L, M or H lines to corresponding current driver devices $D_L$, $D_M$ or $D_H$ in response to the manually set position of SW-1 and the ON or OFF state of sensors 10 and 30 when the light levels detected by those sensors are above predetermined thresholds sufficient to trigger associated logic elements.

The following Truth Table reflects the function of the control circuit 100 based upon the variables of the setting of switch SW-1, the state of high-beam sensor 30 and the state of mid-beam sensor 10.

| | TRUTH TABLE | | |
|---|---|---|---|
| SW-1 | HI-SENSOR 30 | MID-SENSOR 10 | LIGHTS ON |
| HIGH | OFF | OFF | HIGH/MID/LOW |
| HIGH | ON | OFF | MID/LOW |
| HIGH | ON | ON | LOW |
| MID/LOW | — | OFF | MID/LOW |
| MID/LOW | — | ON | LOW |

In the first instance when the switch SW-1 is set to its High position, the vehicle operator expects the filaments in high-beam lamps 40 and 42 to be energized along with the mid-beam filaments and low-beam filaments in lamps 20 and 22, to provide maximum light output from the vehicle headlighting system. If no oncoming vehicles are sensed by either the high-beam sensor 30 or the mid-beam sensor 10, the AND gate 102 receives a relatively high (logic "1") level on line C and a relatively high (logic "1") level from inverter 110. The AND gate 102 therefore outputs a relatively high (logic "1") level on line H to bias the current driver $D_H$ ON. With driver $D_H$ in an ON (conducting state) the high-beam filaments of headlamps 40 and 42 are energized. Likewise, a direct connection on line C through diode 126 is made to bias the low-beam current driver $D_L$ ON. With the current driver $D_L$ in its ON state, the low-beam filaments in lamps 20 and 22 are thereby energized. The absence of detected light by both high-beam sensor 30 and mid-beam sensor 10 (logic "0") causes the output of AND gate 106 to be at a low level (logic "0"). The output of AND gate 106 is inverted to a relatively high (logic "1") level by inverter 116. The output of inverter 116 (logic "1") is passed by diode 124 and causes the current driver $D_M$ to be biased ON. With current driver $D_M$ in an ON state, the mid-beam filaments in lamps 20 and 22 are also energized.

In the second instance, with the switch SW-1 still set in the High position, an assumption is made that the high-beam sensor 30 detects an oncoming vehicle and the mid-beam sensor 10 does not indicate such a detection. In that case, the change in signal on line A does not affect the relatively low (logic "0") output state of AND gate 106 and the mid-beam current driver $D_M$ continues to be biased ON. However, the inverter 110 inverts the relatively high (logic "1") signal from sensor 30 to provide a relatively low (logic "0") output signal to an input terminal of AND gate 102. That combination of input signals to AND gate 102 causes the output of AND gate 102 to be switched to a relatively low (logic "0") signal. That low signal is carried by line H to thereby bias the current driver $D_H$ to an OFF state. With current driver $D_H$ in an OFF state, the high-beam filaments in lamps 40 and 42 are deenergized. The high-beams remain deenergized until the sensor 30 ceases to detect the presence of oncoming vehicle lamps in its field of view.

In the third instance, where the mid-beam sensor 10 also detects the presence of oncoming vehicle headlamps within its mid-beam pattern projection area field of view, both the sensor 10 and the sensor 30 provide relatively high (logic "1") signal levels on lines A and B. This change from the preceding instance will cause the AND gate 106 to change state and provide a relatively high (logic "1") level output, since all three input levels are at a relatively high (logic "1") state. The high (logic "1") output level of 106 is inverted by inverter 116 to a relatively low (logic "0") level which biases the driver $D_M$ to its OFF state. In that instance, the mid-beam filaments in lamps 20 and 22 are also extinguished, leaving only the low-beam filaments energized. The mid-beam filaments remain extinguished until the detector 10 no long senses the presence of oncoming vehicle headlamps in its field of view.

In the fourth instance, where the switch SW-1 is manually set to the Mid/Low position, the high-beam filaments in lamps 40 and 42 are not energized and detection of oncoming headlamps by the high-beam sensor 30 have no effect on the circuit. However, assuming that no oncoming headlamps are detected by the mid-beam sensor 10, all three inputs to the AND gate 104 are at a relatively high (logic "1") level and the output of the AND gate 104 is at a relatively high (logic "1") level. This high level output of AND gate 104 is communicated through diode 122 to bias the current driver $D_M$ to an ON state and thereby cause the mid-beam filaments in lamps 20 and 22 to be energized. The low-beam filaments in lamps 20 and 22 are maintained in an energized condition by the current driver $D_L$ that is biased to its ON state via diode 128 and switch SW-1.

In the event the mid-beam sensor 10 detects the presence of oncoming headlamps within its limited field of view, the voltage signal produced on line B is inverted by inverter 114 to provide a relatively low (logic "0") level input to the AND gate 104. Consequently, the AND gate 104 switches to a relatively low output state and the current driver $D_M$ is biased to its OFF state, thereby extinguishing the mid-beam filaments and leaving only the low-beam filaments to be energized.

It makes previously proposed "tri-beam" headlighting systems more acceptable since it can be seen from the foregoing description that the present invention provides an automated system for down-switching beam patterns to avoid producing glare in the eyes of drivers of oncoming vehicles.

It will be apparent that many modifications and variations may be implemented without departing from the scope of the novel concept of this invention. Therefore, it is intended by the appended claims to cover all such modifications and variations which fall within the true spirit and scope of the invention.

I claim:

1. A method of controlling the down-switching of a multibeam pattern headlamp system in a vehicle when opposing vehicles approach within the corresponding beam pattern, comprising the steps of:

providing headlamps on said vehicle for projecting a plurality of predetermined high intensity patterns directed outwardly from the vehicle in overlapping areas;

providing a source of electrical energy for energizing the headlamps;

providing a switching means that is controllable to connect said source of electrical energy to selected headlamps;

providing a first sensor for sensing the presence of headlamp radiation from oncoming vehicle headlamps over a wide range including said overlapping areas of said beam patterns and indicating said presence when said oncoming radiation is sensed as being above a predetermined threshold;

providing a second sensor for sensing the presence of headlamp radiation from oncoming vehicle headlamps within a limited area of said overlapping beam patterns corresponding to one of the beam patterns and indicating said presence when the intensity of said oncoming radiation is sensed as being above a predetermined threshold; and controlling said switching means in response to the indications from said first and second sensors in order to down-switch said headlamp beam patterns by disconnecting said source of electrical energy from appropriate headlamps and restoring said connections when said first and second sensors cease to provide said indications.

2. A method as in claim 1, wherein said headlamps are provided with individual light sources to provide beam patterns that are defined as a first beam pattern projected slightly below the horizontal plane extending through the corresponding light source, a second beam pattern that has its highest intensity overlapping and slightly above the first beam pattern and directed to the right of the center line running the length of said vehicle, and a third beam pattern that has its highest intensity overlapping and above the second beam pattern; said step of controlling includes down-switching said headlamps from said third beam projection pattern to said second beam and said first beam projection patterns when said third beam pattern sources are selectively manually energized and said first sensor detection indicates oncoming headlamp radiation; said step of controlling includes down-switching said headlamps from said second beam projection pattern illumination to said first beam projection pattern when said second sensor also indicates oncoming headlamp radiation.

3. A method as in claim 2, wherein said second sensor is provided on said vehicle so as to be unaffected by radiation from oncoming headlamps when said radiation is from a source that is outside the area of said second beam projection pattern.

4. A method as in claim 3, wherein said step of controlling includes the step of down-switching said headlamps from said second beam projection pattern illumination to said first beam projection pattern when only said second beam and first beam light sources are manually selected for energization and said second sensor indicates oncoming headlamp radiation.

5. A method as in claim 4, wherein said step of controlling includes the step of reconnecting the manually selected headlamp light sources to the electrical energy source when the corresponding sensor ceases to indicate the sensing of oncoming headlamp radiation.

6. An apparatus for controlling the down-switching of a multibeam pattern headlamp system in a vehicle when opposing vehicles approach within the corresponding beam patterns, comprising:
   headlamps on said vehicle for projecting a plurality of predetermined high intensity patterns outwardly from and forward of the vehicle in overlapping areas;
   means for providing a source of electrical energy for energizing the headlamps;
   switching means controllable to connect said source of electrical energy to selected headlamps;
   first sensor means for sensing the presence of headlamp radiation from oncoming vehicle headlamps over a wide range including said overlapping areas of said beam patterns and indicating said presence when said oncoming radiation is sensed as being above a predetermined threshold;
   second sensor means for sensing the presence of headlamp radiation from oncoming vehicle headlamps within a limited area of said overlapping beam patterns corresponding to one of the beam patterns and indicating said presence when the intensity of said oncoming radiation is sensed as being above a predetermined threshold; and
   means for automatically controlling said switching means in response to the indications from said first and second sensor means in order to down-switch said headlamp beam patterns by disconnecting said source of electrical energy from appropriate headlamps and restoring said connections when said first and second sensors cease to provide said indications.

7. An apparatus as in claim 6, wherein said headlamps contain individual light sources to provide beam patterns that are defined as a generally downwardly projected first beam pattern, a second beam pattern that has its highest intensity overlapping and slightly above the first beam pattern and being directed to the right of the center line running the length of said vehicle, and a third beam pattern that has its highest intensity overlapping and above the second beam pattern; said control means includes means for down-switching said headlamps from said third beam pattern projection to said second beam and said first beam patterns when said third beam pattern source are selectively manually energized and said first sensor means detection indicates oncoming headlamp radiation; said control means also includes means for down-switching said headlamps from said second beam projection pattern to said first beam projection pattern when said second sensor means also indicates oncoming headlamp radiation.

8. An apparatus as in claim 7, wherein said second sensor means is positioned on said vehicle so as to be unaffected by radiation from oncoming headlamps when said radiation is from a source that is outside the area of said second beam projection pattern.

9. An apparatus as in claim 8, wherein said control means includes means for down-switching said headlamps from said second beam projection pattern to said first beam projection pattern when only said second beam and first beam light sources are manually selected for energization and said second sensor means indicates oncoming headlamp radiation.

10. An apparatus as in claim 9, wherein said control means includes means for reconnecting the manually selected headlamp light sources to the electrical energy source when the corresponding sensor ceases to indicate the sensing of oncoming headlamp radiation.

11. An apparatus as in claim 6, wherein said headlamps contain individual filiments to provide beam patterns that are defined as a low-beam projection pattern, a mid-beam projection pattern that has its highest intensity overlapping and slightly above the low-beam projection pattern and being directed to the right of the center line running the length of said vehicle, and a high-beam projection pattern that has its highest intensity overlapping and above the mid-beam pattern; said control means includes means for down-switching said headlamps from said high-beam pattern projection to said mid-beam and said low-beam patterns when said high-beam pattern filaments are selectively manually energized and said first sensor means detection indicates oncoming headlamp radiation; said control means also includes means for down-switching said headlamps from said mid-beam projection pattern to said low-beam projection pattern when said second sensor means also indicates oncoming headlamp radiation.

12. An apparatus as in claim 11, wherein said second sensor means is positioned on said vehicle so as to be unaffected by radiation from oncoming headlamps when said radiation is from a source that is outside the area of said mid-beam projection pattern.

13. An apparatus as in claim 12, wherein said control means includes means for down-switching said headlamps from said mid-beam projection pattern to said low-beam projection pattern when only said mid-beam and low-beam filiments are manually selected for energization and said second sensor means indicates oncoming headlamp radiation.

14. An apparatus as in claim 13, wherein said control means includes means for reconnecting the manually selected headlamp filaments to the electrical energy source when the corresponding sensor ceases to indicate the sensing of oncoming headlamp radiation.

15. An automatic headlamp dimming control system for an automotive vehicle comprising:
   means for projecting a plurality of distinct but overlapping light beam patterns over corresponding projecting area from the front of an automotive vehicle, designated low, mid and high light beam patterns;
   means for selecting to project a first beam pattern, which is said low and mid beam patterns together, or to project a second beam pattern which is said low, mid and high beam patterns together;

first means for sensing light from oncoming vehicle headlamps occurring only within the projecting area of said first beam pattern;

second means for sensing light from oncoming vehicle headlamps occurring within the projecting area of said second beam pattern;

means connected to said first and second sensing means for responsively down-switching from the mid beam pattern to the low beam pattern when said first beam pattern is selected and said first sensing means detects the light from oncoming vehicle headlamps, and for responsively down-switching from the high beam pattern to the mid beam pattern when said second beam pattern is selected and said second sensor means detects the light from oncoming vehicle headlamps and to the low beam pattern when said second beam pattern is selected and both said first and second sensors detect the light from oncoming vehicle headlamps.

16. A system as in claim 15, wherein said down-switching means returns the beam patterns to those selected when the respective sensor means no longer detect the light from oncoming vehicle headlamps within their corresponding beam pattern projection areas.

17. A method for automatically controlling the headlamp dimming for an automotive vehicle comprising the steps of:

providing means for projecting a plurality of distinct but overlapping light beam patterns over corresponding projecting area from the front of an automotive vehicle, designated low mid and high light beam patterns;

selectively projecting a first beam pattern, defined as said low and mid beam patterns together, or projecting a second beam pattern defined as said low, mid and high beam patterns together;

sensing light from oncoming vehicle headlamps occurring only within the projecting area of said first beam pattern;

sensing light from oncoming vehicle headlamps occurring within the projecting area of said second beam pattern;

down-switching from the mid beam pattern to the low beam pattern when said first beam pattern is selected and light from oncoming vehicle headlamps is sensed as occurring within said first beam pattern projection area, and down-switching from the high beam pattern to the mid beam pattern when said second beam pattern is selected and light from oncoming vehicle headlamps is sensed as occurring within said second beam pattern area and not sensed as occurring within said first beam pattern area and down-switched to said low beam pattern when said second beam pattern is selected and light from oncoming vehicle headlamps is sensed as occurring in both said first and second beam pattern projection areas.

18. A method as in claim 17, further including the steps of: returning the beam patterns to those selected when the light from oncoming vehicle headlamps is no longer sensed within the corresponding beam pattern projection areas.

* * * * *

UNITED STATES PATENT AND TRADEMARK OFFICE
CERTIFICATE OF CORRECTION

PATENT NO. : 4,862,037

DATED : August 29, 1989

INVENTOR(S) : Eugene I. Farber, et al

It is certified that error appears in the above-identified patent and that said Letters Patent is hereby corrected as shown below:

Figure 5 should be deleted to appear as shown below:

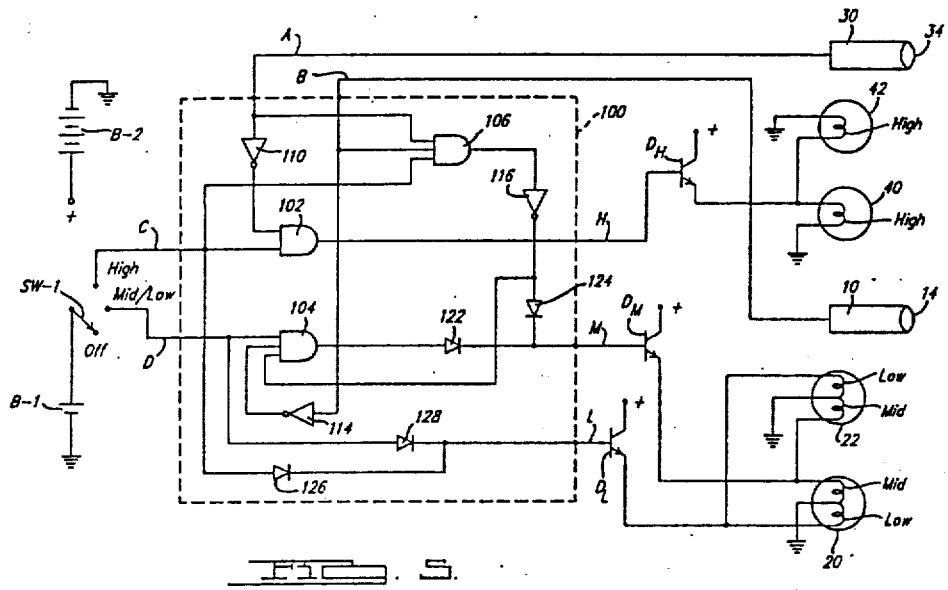

Signed and Sealed this

Twenty-sixth Day of January, 1993

*Attest:*

STEPHEN G. KUNIN

*Attesting Officer*      *Acting Commissioner of Patents and Trademarks*